United States Patent [19]
Puretic

[11] 3,793,760
[45] Feb. 26, 1974

[54] FISH LOADING METHOD

[76] Inventor: Mario J. Puretic, 259-6th Ave., N. Monte Cristo Isle, Tierra Verde, Fla. 33715

[22] Filed: May 20, 1971

[21] Appl. No.: 145,245

[52] U.S. Cl. .......................................... 43/4.5, 43/8
[51] Int. Cl. ............................................ A01k 73/12
[58] Field of Search .......................... 43/4.5, 6.5, 8

[56] References Cited
UNITED STATES PATENTS
| | | | |
|---|---|---|---|
| 3,091,880 | 6/1963 | Puretic | 43/8 |
| 1,606,668 | 11/1926 | Rubach | 43/6.5 |
| 1,138,541 | 5/1915 | Conekin | 43/6.5 |

FOREIGN PATENTS OR APPLICATIONS
| | | | |
|---|---|---|---|
| 1,088,891 | 10/1967 | Great Britain | 43/6.5 |

*Primary Examiner*—Warner H. Camp
*Attorney, Agent, or Firm*—Fulwider, Patton, Rieber, Lee & Utecht

[57] ABSTRACT

A fish loading method for transferring fish from a net gathered alongside a fishing boat into the hold of the fishing boat. The method includes providing a fish receiving aperture formed in the side of the boat adjacent the boat's water-line. A gate normally closes this aperture, with the gate being opened during a loading operation. A conveyor belt leads from the aperture to a deck of the boat. A power-operated pressure bar is movable vertically in the aperture and in its lower position wedges a portion of the net during a loading operation. The remaining portion of the net is progressively raised and gathered towards the aperture so as to progressively float fish from the net into and through the fish receiving aperture. The conveyor belt then moves the fish upwardly and inboard for transfer to the boat's hold or holds.

2 Claims, 6 Drawing Figures

PATENTED FEB 26 1974

INVENTOR.
MARIO J. PURETIC
BY Fulwider, Patton, Rieber, Lee and Utecht
ATTORNEYS

PATENTED FEB 26 1974 3,793,760

INVENTOR.
MARIO J. PURETIC
BY
Fulwider, Patton, Rieber,
Lee and Utecht
ATTORNEYS

INVENTOR.
MARIO J. PURETIC

FISH LOADING METHOD

BACKGROUND OF THE INVENTION

1. Field of the Invention

The present invention relates generally to the art of fishing, and more particularly to a novel method for recovering fish from a net and transferring such fish into the hold or holds of a fishing boat.

2. Description of the Prior Art

Although fishing is one of the oldest arts, comparatively little has been done over the years to change apparatus and methods that have been utilized in the fishing art for centuries. A fundamental and novel advance in the art of fishing is disclosed in my U. S. Letters Pat. Nos. 2,733,530 and 2,733,531, issued Feb. 7, 1956. These patents relate to an apparatus and method for drawing a net alongside a fishing boat by means of a power-driven block suspended from a boom on the boat. Th use of such power-driven block has greatly expedited the hauling-in of the net alongside the boat, and it has been possible in many cases to substantially reduce the number of men required for a commercial fishing boat crew. Although the use of such power-driven blocks permits the netted fish to be brought alongside the fishing boat in a minimum period of time, there still remains the difficult problem of recovering the fish from the net and transferring the fish into the hold of the fishing boat.

It is conventional to scoop the netted fish from the net by means of a shallow, basket-like device, generally termed a brailer. This brailer generally comprises a rigid hoop approximately 5 or 6 feet in diameter from which depends an open-topped bag-like net. The hoop is attached to a long handle. This handle is manipulated by two or three men positioned in a large skiff alongside the fishing boat. These men manually urge the hoop into the mass of heavy fish within the seine. Thereafter, the hoop is hoisted towards the fishing boat by means of a line attached thereto and extending to the fishing boat's deck. During this operation the skiff is usually pitching heavily in the sea. Thus, the brailing operation is a dangerous job requiring great experience and tremendous strength. Moreover, this operation is time consuming. Alternatively, the netted fish may be pumped into the fishing boat. This system, however, is only useable with smaller fish.

The problems described above have been increased by the recent introduction of very large purse seine vessels having high freeboards. On these vessels the decks are considerably elevated above the water and the difficulty of brailing or scooping the fish from the net is increasingly hazardous and strenuous.

SUMMARY OF THE INVENTION

In general the fish loading method of the present invention includes providing a fish receiving aperture in the side of the boat adjacent the boat's water-line, with a gate normally closing the aperture and such gate being movable to an open position during a loading operation. A conveyor belt transfers fish upwardly from the aperture to a position above and inboard the aperture. The boat is provided with holding means adjacent the aperture engageable with a portion of the net to hold such net portion during a loading operation, and the boat is provided with power-operated net retrieving means that is operated to progressively raise and gather the remaining portion of the net toward the aperture so that fish trapped in the net may be progressively urged toward the aperture to float out of the net into and through the aperture. The conveyor then lifts these fish to a point on the boat where such fish may be directed to the fish-receiving hold or holds of the boat.

More particularly, the preferred fish loading method of the present invention utilizes a fish gate which is movable vertically relative to the aperture by means of a fluid pressure-driven cylinder and plunger unit. The net holding means preferably takes the form of a horizontal pressure bar movable between a raised inoperative position and a lowered position wherein it wedges a portion of the net against the lower edge of the fish receiving aperture. The pressure bar is also preferably operated by a fluid pressure-driven cylinder and plunger arrangement.

DESCRIPTION OF THE PREFERRED EMBODIMENT

Figure 1:
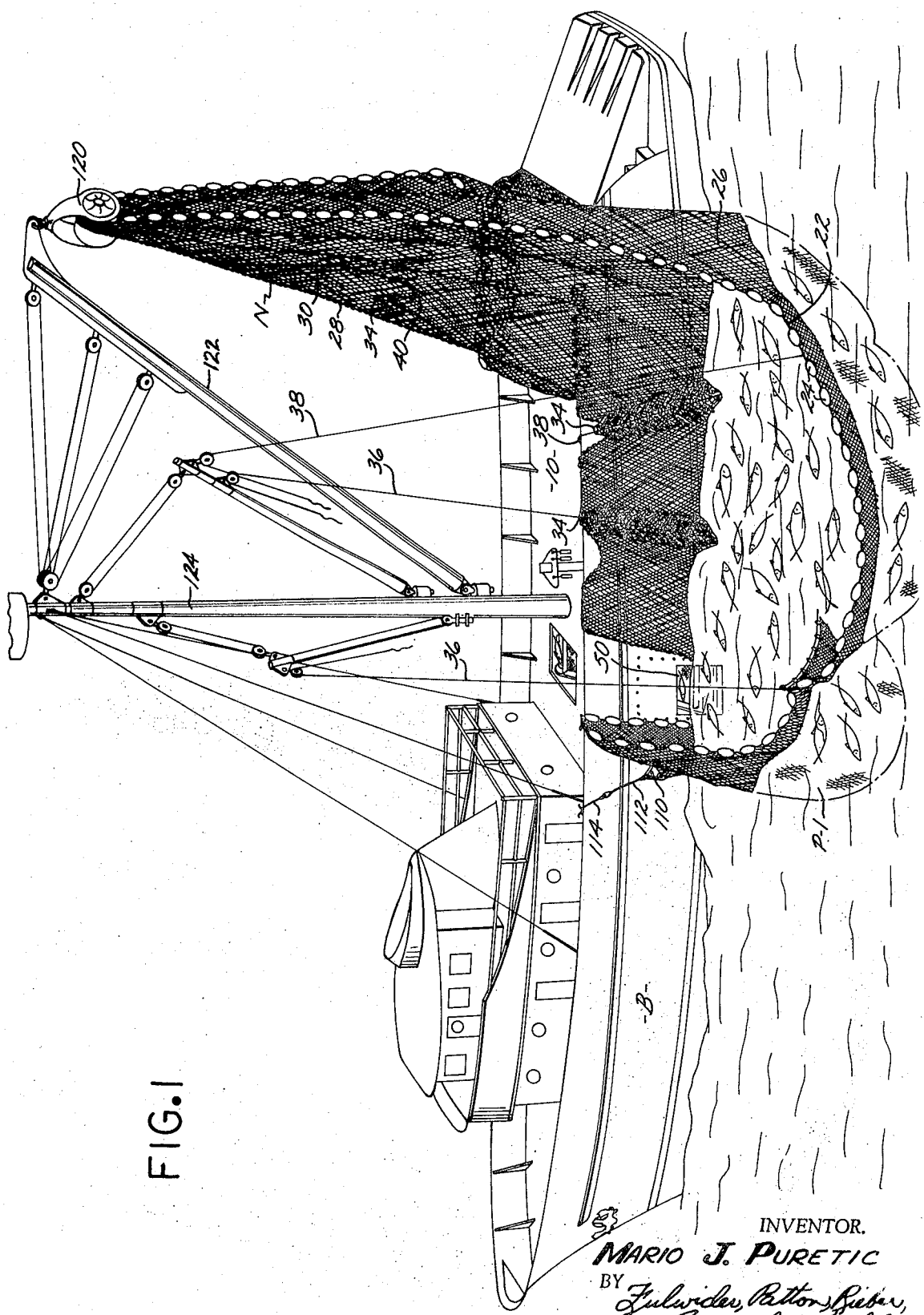
FIG. 1 is a perspective view showing a fishing boat equipped with a preferred form of a fish loading apparatus for carrying out the method embodying the present invention.

Referring to FIG. 1 there is shown a fishing boat B having a fish receiving deck 10. The fishing boat B is provided with a net N, the net N is commonly termed a seine net and includes a "float" or "cork line" 22 which as its name implies has a number of corks, floats, or other buoyant bodies 24 attached thereto at spaced intervals. An elongated wall or panel of webbing 26 is supported from the cork line 22. The lower edge of the webbing panel 26 is affixed to a chain 28, such chain defining a so-called "lead line". A plurality of ring cables 30 are secured to chain 28 at spaced intervals. Each of the ring cables 30 is secured to a pursing line (not shown) in a conventional manner. The pursing line is adapted to have its length reduced so as to "purse" the lower portion of the webbing panel together in a conventional manner. It should be noted that the intermediate portion of the webbing panel 26 is provided with a plurality of rows of rings 34 which receive zipper lines or cables 36, 38 and 40. The operation of the zipper lines is described hereinafter.

Figure 2:
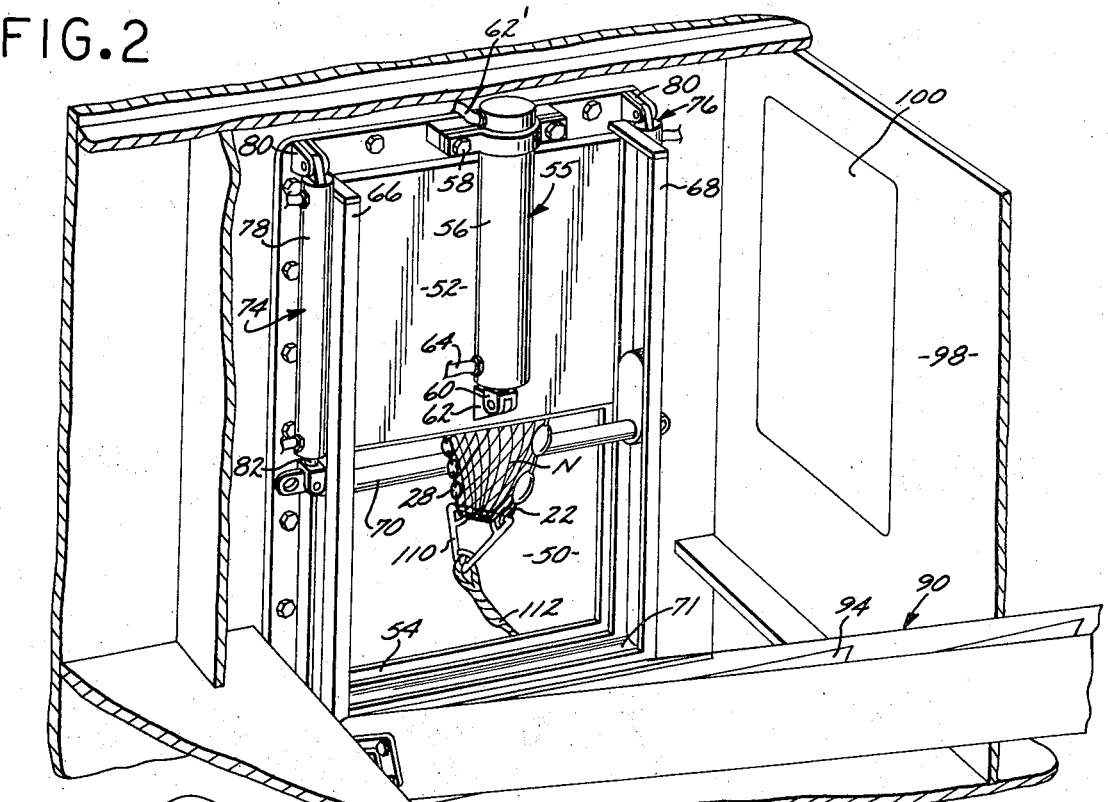
FIG. 2 is a broken perspective view showing the details of the fish receiving aperture, the fish gate, and the pressure bar utilized with said fish loading apparatus.
Figure 3:
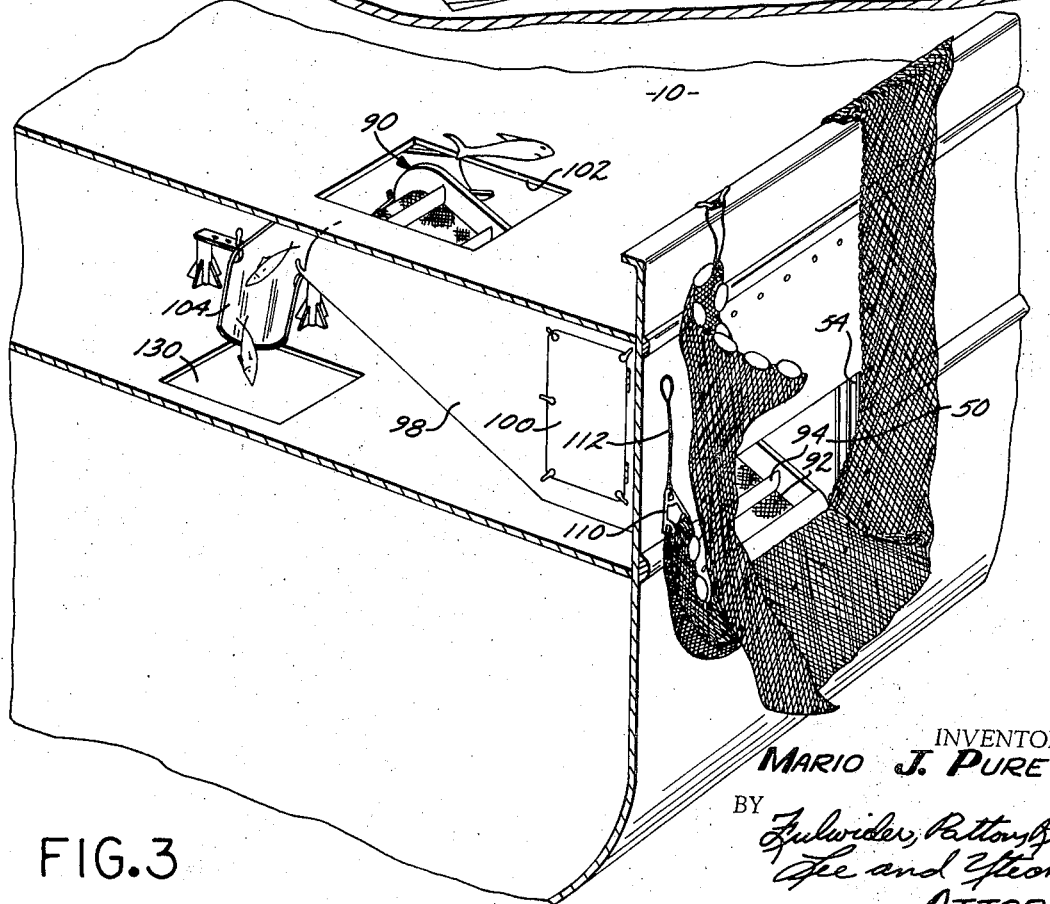
FIG. 3 is a broken perspective view particularly showing the side of the apparatus opposite that shown in FIG. 2.

Referring additionally to FIGS. 2 and 3, the hull of the fishing boat B is formed with a fish-receiving aperture 50 adjacent the water-line thereof. A gate, generally designated 52, is positioned immediately inwardly of the aperture 50 for vertical movement relative thereto. The gate 52 normally closes the aperture 50, with such gate being raised to an open position during a fish loading operation. Referring particularly to FIG. 2, the gate 52 may take the form of a steel plate arranged to slide vertically within a generally rectangular frame 54. A conventional fluid pressure-operated cylinder and plunger unit 55 has its cylinder 56 secured at its upper end to the upper portion of the frame work by a bracket arrangement 58. A plunger 60 reciprocally extends from the lower end of the cylinder 56 and has its lower end affixed to an inwardly extending bracket 62 that is welded or otherwise affixed to the lower portion of the gate 52. The upper and lower ends of the cylinder 56 are provided with conduits 62' and 64 which are connected with a source of pressurized fluid by suitable valving in a conventional manner.

Immediately inwardly of the frame work 54 are fixedly arranged a pair of vertically extending rails 66 and 68. These rails serve to slidably support the opposite ends of a horizontal pressure bar 70. The lower ends of rails 66 and 68 are interconnected by a pressure pad 71 of concave cross-section. The pressure bar is movable vertically between its raised position of FIG. 2 and its lowered position of FIGS. 3 and 6 by means of a pair of conventional fluid pressure operated cylinder and plunger units 74 and 76. The units 74 and 76 are of like construction and each include a cylinder 78 having its upper end affixed to a bracket 80 that is welded or otherwise affixed to the upper sides of the rails 66 and 68. A plunger 82 reciprocally extends from the lower end of each cylinder 78 and each plunger 82 is affixed to an opposite end of pressure bar 70.

A power-operated fish conveyor means extends upwardly and inboard relative to the fish-receiving aperture 50. The conveyor means 90 preferably takes the form of a conventional conveyor belt having an endless belt member 92 provided with transverse ribs 94 at longitudinally spaced portions therealong. The belt 92 is operated by means of a conventional hydraulic or electric motor (not shown). The conveyor means 90 is housed within a generally water-tight ramp enclosure 98 which may be provided with an access door 100. The ramp enclosure 98 prevents unrestrained entrance of seawater into the hull of the fishboat B through the fish-receiving aperture 50 when gate 52 is in its raised position.

The deck 10 is provided with an opening 102 adjacent the upper portion of the conveyor means 90, as indicated particularly in FIG. 3. With a continued reference to FIG. 3, the upper end of the conveyor belt discharges onto a fish chute 104.

In connection with the operation of the aforedescribed apparatus, and with particular reference to FIG. 1, FIG. 2 and FIG. 3, it should be noted that one end portion of the net N is provided with a generally triangular bit 110 to which is secured one end of the cork line 22 and the chain 28. The opposite corner of the bit 110 is affixed to a sling 112.

During a fishing operation the net N is encircled about a school of fish in a conventional manner. At the conclusion of the fish encircling operation the lower end of the net N is pursed by a purse line in the usual manner. The portion of the net opposite bit 110 is then extended through a power-operated gathering device, such as a power block 120 of the type disclosed in my U.S. Letters Pat. No. 2,733,531 issued Feb. 7, 1956. This type of power block has become conventional equipment on most fishing boats and is used to rapidly retrieve a seine net and deposit it upon the deck of a fishing boat. The details of power block 120 is not within the scope of the present invention and hence such details are not set forth herein. As indicated in FIG. 1 however, it will be clear that the power block 120 is supported upon a main boom 124 carried by the mast 125 of the fishing boat B. As indicated in FIG. 1, as the net N is progressively raised and gathered by means of the power block 120, the power block progressively deposits the length of the net on the deck 10 where such net may be suitably piled in a conventional manner.

Figure 6:
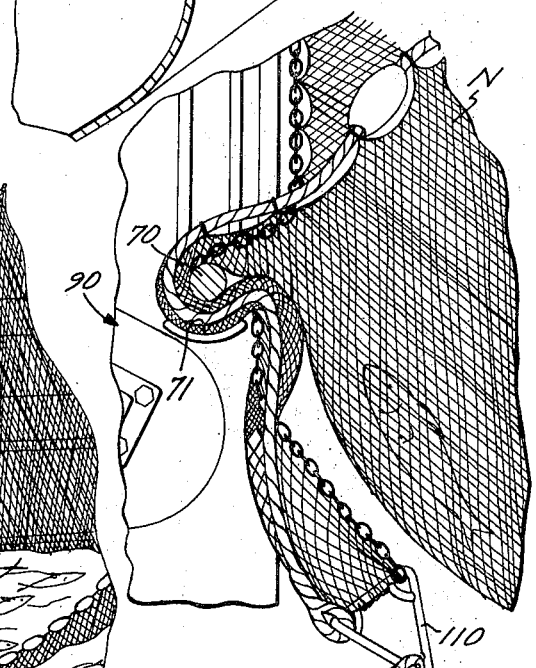
FIG. 6 is a vertical sectional view in enlarged scale showing the operation of the pressure bar of said apparatus.

Prior to the net raising and gathering operation, the sling 112 is manipulated around the pressure bar 70, while such pressure bar is in its raised position, as indicated in FIG. 2. The sling 112 is then handed upwardly to be secured to the outer hull surface as indicated in FIG. 3. Thereafter, the cylinder and plunger units 74 will be actuated so as to urge pressure bar 70 downwardly and thereby wedge the portion of the net adjacent bit 110 tightly against the pressure pad 71, as indicated in FIGS. 3 and 6. Preferably the part of the cork line 22 adjacent the aperture 50 is raised and suspended from the hull as shown in FIGS. 1 and 3 to insure against the escape of any netted fish. As the power block 120 progressively raises and gathers the portion of the net end opposite the end portion fixedly wedged in place by the pressure bar 70, fish trapped in the net will be progressively floated out of the net into and through the aperture 50 under the urging of the net, as indicated in FIG. 1. The conveyor means 90 is operated so as to transfer the fish entering through aperture 50 upwardly and inboard until such fish fall from the upper end of the conveyor belt 92 onto the fish chute 104, as indicated in FIG. 3. The fish chute 104 is directed towards a hatch 130 leading to a fish-receiving hold. It should be understood that additional fish chutes leading to other holds may be employed in addition to fish chute 104. With continued reference to FIG. 3, it should be particularly noted that the main deck opening 102 permits unmarketable fish, such as shark, to be removed from the conveyor belt 92 for temporary storage on deck 10. The unmarketable fish may then be dumped overboard. Alternatively, such fish may be disposed of at the conclusion of the fish loading operation by reversing the direction of the conveyor belt 92 so as to effect overboard discharge of these fish outwardly through aperture 50.

It should be further noted that where a large catch of fish is trapped in the net it may be desirable to exert a strain on the zipper lines 36 so as to form a pocket P-1 into which a first part of the catch is crowded so as to facilitate dumping of the fish into and through the aperture 50, as indicated in FIG. 1.

Figure 5:
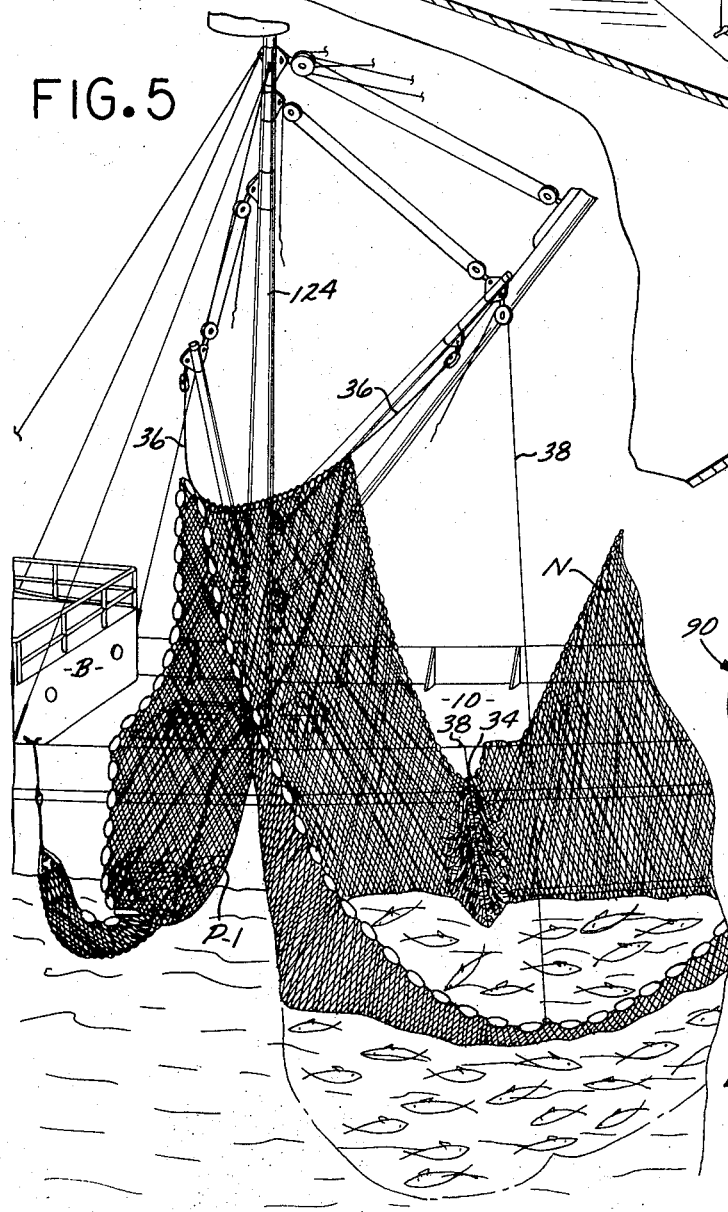
FIG. 5 is a fragmentary perspective view showing the operation of said fish loading apparatus.

Referring to FIG. 5, zipper line 36 may be lifted sufficiently to dump the fish trapped within pocket P-1 through aperture 50. Thereafter, zipper line 36 is loosened and the power block 120 again operated so as to continue to gather the net N. Additional pockets may be formed if desired by means of zipper lines 38 and 40. This method of dumping fish progressively may be termed a "parbuckle system."

Figure 4:
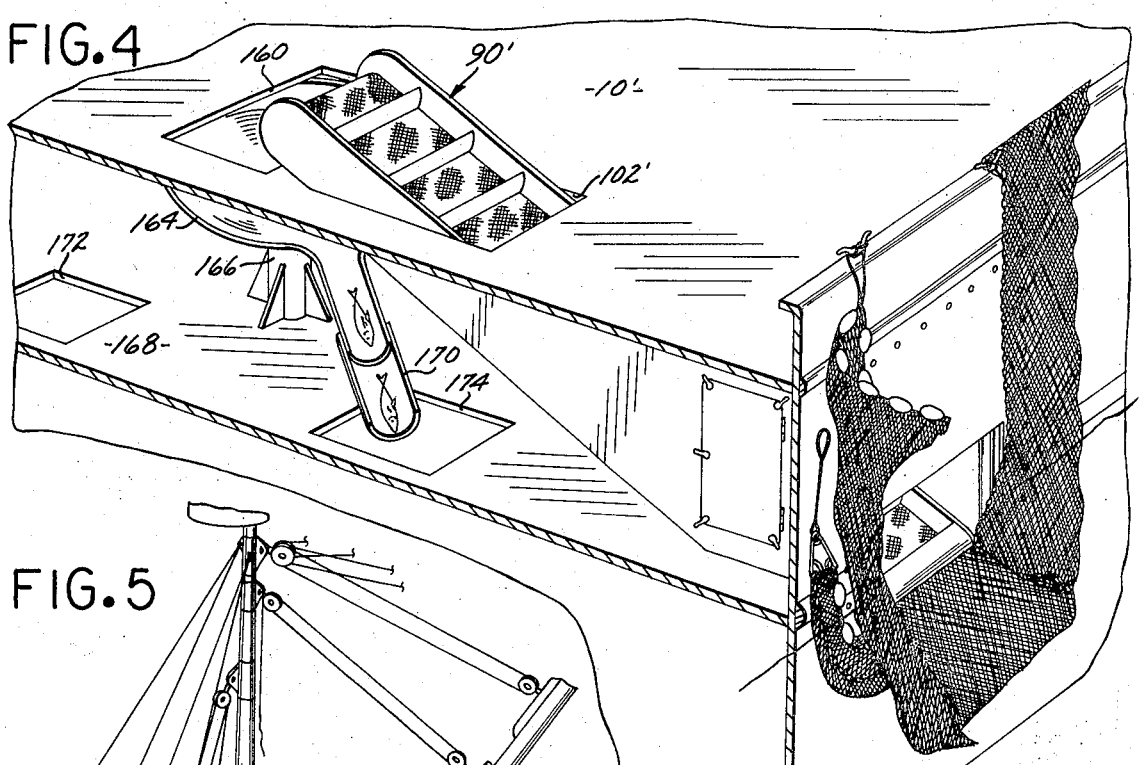
FIG. 4 is a broken perspective view similar to FIG. 3 showing a modified form of the apparatus of FIG. 3.

Referring now to FIG. 4, there is shown a modified form of conveyor arrangement which may be employed with the method of the present invention. In FIG. 4 the upper end of the conveyor belt unit 90' is seen to extend through an aperture 102' formed in the deck 10'. A second opening 160 is formed in deck 10 immediately below the upper end of conveyor belt unit 90'. Opening 160 is spaced immediately above a fish dispenser 164 that is pivotally supported on the upper end of a post 166 carried by lower deck 168. Dispenser 164 includes an extendible chute 170 that can be selectively directed toward several hatch openings 172, 174 leading to fish-receiving holds.

Various modifications and changes may be made with respect to the foregoing description without departing from the spirit of the invention.

I claim:

1. A method of transferring fish from a seine net to the hold of a fishing boat, comprising:
   providing a fish-receiving aperture in side of the hull of said fishing boat adjacent the water-line thereof;
   maintaining said aperture closed during normal operations of said fishing boat;
   trapping fish within said seine net;
   opening said aperture;
   holding a portion of said net adjacent said opened aperture while progressively raising and gathering the remaining portion of said net toward said aperture whereby fish trapped within said net are progressively floated out of said net and through said aperture solely under the urging of said net;
   power-conveying said fish upwardly from said aperture; and
   chuting the trapped fish to said fish hold by gravity.

2. A method as set forth in claim 1 wherein said trapped fish are moved into said aperture by progressively forming pockets in said net and emptying trapped fish from said pockets into said aperture.

* * * * *